United States Patent [19]
Balepin et al.

[11] 3,818,051
[45] June 18, 1974

[54] METHOD FOR PREPARING PROPYLENE OXIDE

[76] Inventors: Alexandr Alexeevich Balepin, ulitsa Shvernika, 14/1, korpus 1, kv. 21; Alexandr Vasilievich Bobolev, Leninsky prospekt, 30, kv. 104,; Jury Alexandrovich Buslaev, ulitsa Garibaldi, 19, korpus 4, kv. 44; Vladimir Ivanovich Chagin, Chernomorsky bulvar, 4, kv. 416; Nikolai Markovich Emanuel, Vorobievskoe shosse, 2b, kv. 44, all of Moscow; Andrei Ivanovich Sergeev, ulitsa Chkalova, 47, kv. 49, Zhukovsky Moskovskoi oblasti, all of U.S.S.R.

[22] Filed: July 12, 1972

[21] Appl. No.: 271,187

[30] Foreign Application Priority Data
Aug. 31, 1971 U.S.S.R............................. 1690667

[52] U.S. Cl........................................ 260/348.5 V
[51] Int. Cl................................................ C07d 1/12
[58] Field of Search............................ 260/348.5 V

[56] References Cited
FOREIGN PATENTS OR APPLICATIONS
1,459,880  10/1966  France......................... 260/348.5 V

*Primary Examiner*—Norma S. Milestone
*Attorney, Agent, or Firm*—Holman & Stern

[57] ABSTRACT

A method for preparing propylene oxide by oxidizing propylene with atmospheric oxygen in the presence of oxyfluoride derivatives of molybdenum or tungsten, or mixtures thereof, for example, $(Me)_2MoO_2F_4$, $(Me)_2WO_2F_4$ or $(Me)_3W_2O_4F_7$, where Me is $NH_4$, K, Rb or Cs. The oxidation is carried out in organic solvents oxidizable to hydroperoxides, for example ethylbenzene, isobutane and isopentane.

6 Claims, No Drawings

METHOD FOR PREPARING PROPYLENE OXIDE

BACKGROUND OF THE INVENTION

This invention relates to the preparation of propylene oxide.

Propylene oxide is one of the best starting materials for the manufacture of polymers (polyesters, polyurethanes, foams, rubbers, etc.,) for the synthesis of glycerin, propylene glycol, surfactants for the oil recovery and refining industries, and for the manufacture of synthetic detergents; moreover, propylene oxide is also used as an independent product, viz., as a solvent for chemical industry.

The chlorohydrine method is at the present time practically the sole commercial method for producing propylene oxide. One ton of propylene oxide is obtained by processing three tons of chlorine and alkali, and the amount of waste products is as large as 40 tons which are not utilized and are a source of contamination of the environment. Many authors propose their methods for preparation of propylene oxide without using chlorine, by oxidizing propylene in the liquid phase. These methods include mutual oxidation of propylene with the other organic compounds, viz, aldehydes, ketones, hydrocarbons, which are oxidized more readily than the given olefin at a temperature from 120° to 200°C and a pressure of from 50 to 100 atm in reaction kettles made of materials resistant toward the action of formic and acetic acid solutions (Author's Certificate of the USSR No. 172,296, French Pat. No. 1,397,611 and British Pat. No. 1,080,462 and epoxidation of propylene by hydroperoxides in the presence of catalysts (U.S. Pat. Nos. 3,351,635 and 3,350,422).

Methods are also known in the prior art by which propylene is oxidized directly by oxygen-containing gases (air) into propylene oxide, propylene glycol and other products. The oxidation of propylene in the liquid phase at elevated temperatures and pressures requires various solvents, such as benzene (British Pat. No. 917,926), acetone (U.S. Pat. No. 3,228,967), acetonitrile (U.S. Pat. No. 3,210,380), acetophenone, benzophenone (U.S. Pat. No. 3,232,957), chlorobenzene, fluorobenzene (U.S. Pat. No. 3,238,229), trimethyl borate (U.S. Pat. No. 3,210,381), dimethyl phthalate (U.S. Pat. No. 3,338,124), methyl acetate, ethyl acetate (U.S. Pat. No. 3,275,662), esters of benzoic acid (U.S. Pat. No. 3,281,433), propylene glycoldiacetate (U.S. Pat. Nos. 3,153,058; 3,350,415; and 3,350,421). The yield of propylene oxide produced by the methods described in the above patents is only 20–50 percent with respect to the converted propylene, the conversion degree being 10–40 percent.

In order to increase the propylene oxide yield, the reaction vessels are coated on the inside with various materials, like "Teflon" (USSR Inventor's Certificate No. 225,158, British Pat. No. 1,187,094, French Pat. No. 1,540,963), ceramic, glass, aluminum, nickel, silver (U.S. Pat. No. 3,350,418). The yield of propylene oxide in the processes described in these patents is about 48 percent.

To increase the yield of propylene oxide in the process of direct oxidation of propylene, various catalysts are also used, such as organic salts of cobalt, manganese, copper, vanadium (U.S. Pat. Nos. 2,741,623; 3,071,601) oxides and salts of rhenium (U.S. Pat. No. 3,316,279), and cobalt caprylate (U.S. Pat. No. 3,222,382). The yield of propylene oxide is 39.5 percent.

Another method for preparing propylene oxide is described in French Pat. No. 1,143,577. The process is carried out in the presence of salts of copper, manganese, nickel, iron, vanadium, ruthenium, cobalt and chromium. The yield of propylene oxide is 35 percent.

French Pat. No. 1,506,803 proposes a method for oxidation of propylene in the presence of silver applied onto molybdenum, molybdic acid, naphthenates of cobalt and vanadium. The highest yield of propylene oxide is 41 percent.

The main disadvantages of the described methods for oxidation of propylene in various solvents are low selectivity of the oxidation process, the high yields of the acids (e.g., acetic and, in particular, formic acids) which are formed along with propylene oxide. The introduction of various catalysts and rapid removal of the said acids from the reaction mixture proposed by some inventors to prevent their reaction with propylene oxide, etc., fail to ensure effectiveness of the production of propylene oxide (U.S. Pat. Nos. 2,784,202, 3,071,601, 3,153,058, British Pat. No. 917,926).

SUMMARY OF THE INVENTION

The object of this invention is to increase the selectivity of oxidation of propylene into propylene oxide and to decrease the yields of formic and acetic acids by employing new catalysts.

The object has been attained by the method for preparing propylene oxide by catalytic oxidation of propylene with atmospheric oxygen in organic solvents at temperatures from 120° to 200°C and pressures from 50 to 100 atm in reaction vessels manufactured from materials resistant toward the action of formic and acetic acids, in which according to the invention, propylene is oxidized over catalysts which are complex derivatives of molybdenum oxyfluoride and tungsten oxyfluoride, or mixtures thereof. These catalysts can be both homogeneous and heterogeneous, depending on their structure.

DESCRIPTION OF THE PREFERRED EMBODIMENTS

The proposed oxyfluoride derivatives of molybdenum, according to the invention have the following formula: $(Me)_2MoO_2F_4$ where Me is $NH_4$, K, Rb or Cs.

The oxyfluoride derivatives of tungsten have the formula: $(Me)_2WO_2F_4$, where Me is Rb, Cs or $NH_4$, or $(Me)_3W_2O_4F_7$ where Me is Rb or Cs.

The said catalysts should be taken in quantities from 0.01 to 0.3 percent by weight to ensure good results.

Solvents oxidizable to hydroperoxides should be preferably used as organic solvents. Such solvents are, e.g., ethylbenzene, isopropylbenzene, isobutane, isopentane, and also cyclohexane and some others. If the process is carried out in such solvents as ethylbenzene and isopropylbenzene; the yield of propylene oxide is as high as 91 and even 98 molar percent.

The oxidation of propylene is usually carried out in reaction kettles manufactured of materials resistant toward the aggressive action of formic and acetic acids which are formed in the reaction. Such materials are stainless steel, titanium, titanium alloys, enamel, "Teflon," etc.

For better understanding of the invention it will be illustrated by the following examples.

EXAMPLE 1

The process of propylene oxidation is carried out in a stainless steel reactor, provided with condensers cooled by water and carbon dioxide, a magnetic stirrer and a sampling device. The capacity of the reaction kettle is 280 ml. The reaction kettle is loaded with 100 ml of benzene, 30 ml of propylene, and 0.3 g of the catalyst, $(NH_4)_2MoO_2F_4$. The kettle is sealed and air is delivered at a pressure to 50 atm from a compressed air cylinder. The reaction kettle is heated to 170°C, the pressure is raised to 80 atm, and air is bubbled at a rate of 30 litres per hour. Before admission to the reaction kettle, the air is passed through a special device where it is saturated with propylene vapour. This ensures the constant concentration of propylene dissolved in benzene.

As the oxidation process is carried out, samples of the reaction mixture are taken which are analyzed by the gas partition chromatographic and chemical methods.

Table 1 shows the composition of the propylene oxidation products obtained in a 30-minute long process. The yields of the products given in Table 1 and in all other tables that follow hereinafter have been calculated with reference to 1 ton of the converted propylene.

Table 1

| Reaction products | Mol/litre | (w/w) | kg/ton of propylene | kg/ton of propylene oxide |
| --- | --- | --- | --- | --- |
| Propylene oxide | 0.46 | 0.30 | 905 | — |
| Propylene glycol | 0.06 | 0.05 | 155 | 172 |
| Propylene glycol formiate | 0.03 | 0.04 | 106 | 117 |
| Acetic acid | 0.06 | 0.04 | 122 | 135 |
| Formic acid | 0.09 | 0.05 | 141 | 156 |
| Acetaldehyde | 0.02 | 0.10 | 30 | 33 |
| Acetone | 0.01 | 0.06 | 20 | 22 |
| Isopropanol | 0.01 | 0.07 | 20 | 22 |
| Methanol | 0.03 | 0.11 | 33 | 36 |
| Methyl formiate | 0.02 | 0.13 | 41 | 45 |
| Allyl alcohol | 0.01 | 0.06 | 20 | 22 |

The degree of conversion of propylene is 16 molar percent. The yield of propylene oxide with respect to the reacted propylene is 66 molar percent.

EXAMPLE 2

The procedure is the same as described in Example 1, except that the reaction kettle, the cooler and the other parts of the unit are lined with "Teflon" ("Fluoroplast-4").

The reaction temperature is 170°C; pressure, 50 atm; the solvent is acetone; the catalyst, $(NH_4)_2MoO_2F_4$, taken in an amount of 0.3 g.

Table 2 shows the composition and the yields of the propylene oxidation products obtained in the reaction continued for 45 minutes. The degree of conversion of propylene is 16 molar percent. The yield of propylene oxide with respect to the reacted propylene is 63 molar percent.

EXAMPLE 3

The procedure is the same as in Example 1, except that the reaction kettle of stainless steel is lined with molybdenum. The reaction temperature, 145°C; the pressure, 50 atm; the solvent, benzene; the catalyst, $(NH_4)_2MoO_2F_4$, taken in amount of 0.1 g.

Table 3 gives the composition and the yields of the propylene

Table 2

| Reaction products | Mol/lit | (w/w) | kg/ton of propylene | kg/ton of propylene oxide |
| --- | --- | --- | --- | --- |
| Propylene oxide | 0.45 | 3.3 | 875 | — |
| Propylene glycol | 0.06 | 0.06 | 153 | 175 |
| Propylene glycol formiate | 0.03 | 0.04 | 105 | 120 |
| Acetic acid | 0.08 | 0.06 | 161 | 183 |
| Formic acid | 0.15 | 0.09 | 230 | 263 |
| Acetaldehyde | 0.02 | 0.11 | 30 | 34 |
| Acetone | 0.01 | 0.07 | 20 | 23 |
| Isopropanol | 0.01 | 0.07 | 20 | 23 |
| Methanol | 0.03 | 0.12 | 32 | 36 |
| Methyl formiate | 0.02 | 0.15 | 40 | 46 |
| Allyl alcohol | 0.01 | 0.07 | 20 | 23 | oxidation products corresponding to the maximum concentration of propylene oxide in the reaction mixture. The duration of the reaction is 2 hours.

Table 3

| Reaction products | Mol/litre | (w/w) | kg/ton of propylene | Kg/ton of propylene oxide |
| --- | --- | --- | --- | --- |
| Propylene oxide | 0.52 | 3.43 | 860 | — |
| Propylene glycol | 0.05 | 0.43 | 108 | 126 |
| Propylene glycol formiate | 0.03 | 0.35 | 88 | 102 |
| Acetic acid | 0.11 | 0.75 | 188 | 218 |
| Formic acid | 0.18 | 0.94 | 236 | 275 |
| Low boiling products[*] | — | — | 146 | 170 |

[*]Low boiling products are a sum of acetaldehyde, acetone, isopropanol, methanol, methyl formiate and allyl alcohol (See Table 1)

The conversion of propylene is 19.5 molar percent.

The yield of propylene oxide is 62 molar percent.

EXAMPLE 4

The procedure is the same as described in Example 1, except that the reaction kettle is made of titanium (instead of stainless steel). The process temperature, 170°C; pressure, 50 atm; the solvent, benzene; the catalyst, $(NH_4)_2MoO_2F_4$ taken in amount of 0.2 g.

Table 4 gives the concentrations of propylene oxide in the reaction mixture depending on the duration of the reaction, and also the yields of propylene oxide with respect to the reacted propylene in molar percent, depending on the degree of propylene conversion expressed in molar percent.

EXAMPLE 5

The procedure is the same as described in Example 1, except that an alloy of titanium with molybdenum (about 8 percent of molybdenum) is used instead of stainless steel in the manufacture of the reaction kettle. The reaction temperature, 145°C; pressure, 50 atm; the solvent, chlorobenzene; the catalyst, $(NH_4)_2MoO_2F_4$, taken in amount of 0.15 g, and $Rb_2WO_2F_4$, in amount of 0.15 g.

Table 4

| Duration of reaction in minutes | Concentration of propylene in reaction mixture, mol/lit. | Degree of conversion of propylene, mol % | Propylene oxide yield with respect to reacted propylene, mol % |
|---|---|---|---|
| 15 | 0.21 | 7 | 63 |
| 30 | 0.47 | 16 | 64 |
| 45 | 0.60 | 21 | 66 |
| 60 | 0.66 | 26 | 68 |
| 75 | 0.77 | 31 | 67 |
| 90 | 0.84 | 35 | 64 |
| 105 | 0.92 | 38 | 62 |
| 120 | 1.00 | 41 | 59 |
| 180 | 0.68 | 54 | 28 |

Table 5 shows the composition and the yields of the reaction products corresponding to the maximum concentration of propylene oxide in the reaction mixture. The reaction is continued for 2 hours.

Table 5

| Reaction products | Mol/litre | percent (w/w) | kg/ton of propylene | kg/ton of propylene oxide |
|---|---|---|---|---|
| Propylene oxide | 0.60 | 3.14 | 920 | — |
| Propylene glycol | 0.08 | 0.55 | 161 | 175 |
| Propylene glycol formiate | 0.06 | 0.55 | 167 | 182 |
| Acetic acid | 0.02 | 1.10 | 32 | 34 |
| Formic acid | 0.17 | 0.70 | 100 | 110 |
| Low boiling products*) | — | — | 141 | 153 |

*)Low-boiling products are a sum of acetaldehyde, acetone, isopropanol, methanol, methyl formiate, and allyl alcohol (See Table 1).

The degree of propylene conversion is 21 mol. percent.

The yield of propylene oxide with respect to the reacted propylene is 67 molar percent.

EXAMPLE 6

The procedure is the same as described in Example 1, except that an enamelled reaction kettle is used instead of a stainless steel one. The process temperature is 170°C; the pressure 50 atm; the solvent, chlorobenzene; the catalyst, $(NH_4)_2MoO_2F_4$, taken in amount of 0.1 g.

Table 6 shows the composition and the yields of the propylene oxidation products corresponding to the maximum concentration of propylene oxide in the reaction mixture. The duration of the reaction is 1 hour.

Table 6

| Reaction products | mol/litre | Percent (w/w) | kg/ton of propylene | kg/ton of propylene oxide |
|---|---|---|---|---|
| Propylene oxide | 0.40 | 2.10 | 920 | — |
| Propylene glycol | 0.05 | 0.34 | 150 | 163 |
| Propylene glycol formiate | 0.02 | 1.80 | 82 | 89 |
| Acetic acid | 0.02 | 1.10 | 48 | 52 |
| Formic acid | 0.10 | 0.42 | 180 | 196 |
| Low-boiling products | — | — | 140 | 152 |

The degree of propylene conversion is 14 molar percent. The yield of propylene oxide is 67 molar percent.

EXAMPLE 7

The procedure is the same as described in Example 1, except that the reaction kettle is made of titanium. The reaction temperature is 170°C; the pressure, 50 atm.; the solvent, fluorobenzene; the catalyst, $(NH_4)_2MoO_2F_4$ taken in amount of 0.1 g.

Table 7 shows the composition and the yields of the propylene oxidation products corresponding to the maximum concentration of propylene oxide in the reaction mixture. The reaction is continued for 2 hours.

The degree of propylene conversion is 19.5 molar percent.

The yield of propylene oxide, 63 molar percent.

EXAMPLE 8

The procedure is the same as described in example 1. The reaction kettle is made of an alloy of titanium and molybdenum.

Ethylbenzene (100 ml) is used as a solvent, which is

Table 7

| Reaction products | mol/litre | Percent (w/w) | kg/ton of propylene | kg/ton of propylene oxide |
|---|---|---|---|---|
| Propylene oxide | 0.53 | 3.30 | 875 | — |
| Propylene glycol | 0.10 | 0.82 | 216 | 247 |
| Propylene glycol formiate | 0.05 | 0.56 | 148 | 170 |
| Acetic acid | 0.08 | 0.51 | 136 | 156 |
| Formic acid | 0.08 | 0.40 | 105 | 120 |
| Low boiling products | — | — | 148 | 170 | oxidized during the reaction. Propylene is taken in an amount of 30 ml. The reaction temperature is 160°C; the pressure, 50 atm. The catalyst is $Rb_2MoO_2F_4$, taken in an amount of 0.2 g.

Table 8 shows the composition and the yields of the propylene oxidation products in the reaction mixture. The reaction is continued for 2 hours.

Table 8

| Reaction products | Mol/litre | Percent (w/w) | kg/ton of propylene | kg/ton of propylene oxide |
|---|---|---|---|---|
| Propylene oxide | 0.55 | 3.7 | 1270 | — |
| Acetic acid | 0.05 | 0.3 | 119 | 94 |
| Formic acid | 0.05 | 0.3 | 92 | 72 |

The degree of propylene conversion is 14 molar percent. The yield of propylene oxide with respect to the converted propylene, 92 molar percent.

EXAMPLE 9

The procedure is the same as described in Example 1. The reaction kettle is made of titanium. Isopropylbenzene is used as the solvent which is oxidized in the reaction.

Propylene is taken in an amount of 30 ml. The reaction temperature is 160°C, the pressure, 50 atm. The catalyst is $Cs_2MoO_2F_4$, taken in amount of 0.2 g.

Table 9 shows the composition and the yields of the propylene oxidation products corresponding to the maximum concentration of propylene oxide in the reaction mixture. The reaction is continued for 2 hours.

Table 9

| Reaction products | Mol/ litre | Percent (w/w) | kg/ton of propylene | kg/ton of propylene oxide |
|---|---|---|---|---|
| Propylene oxide | 0.71 | 4.8 | 1270 | — |
| Acetic acid | 0.06 | 0.4 | 111 | 88 |
| Formic acid | 0.06 | 0.3 | 83 | 65 |

The degree of propylene conversion is 18 molar percent.

The yield of propylene oxide with respect to the reacted propylene is 92 molar percent.

EXAMPLE 10

The procedure is the same as described in Example 1. The reaction kettle is made of titanium. Isopropylbenzene is used as a solvent. The reaction temperature is 160°C; the pressure, 50 atm. The catalyst is $K_2MoO_2F_4$, taken in amount of 0.2 g.

Table 10 shows the composition and the yields of the propylene oxidation products corresponding to the duration of the reaction of 2 hours.

Table 10

| Reaction products | Mol/ litre | Percent (w/w) | kg/ton of propylene | kg/ton of propylene oxide |
|---|---|---|---|---|
| Propylene oxide | 0.56 | 3.80 | 1270 | — |
| Acetic acid | 0.05 | 0.35 | 117 | 92 |
| Formic acid | 0.05 | 0.37 | 90 | 91 |

The degree of propylene conversion is 14 molar percent.

The yield of propylene oxide is 92 molar percent.

EXAMPLE 11

The procedure is the same as described in Example 1. The reaction kettle is made of titanium. Isopropylbenzene is used as a solvent. The reaction temperature is 160°C, the pressure 50 atm. The catalyst is $(NH_4)_2WO_2F_4$, taken in amount of 0.2 g.

Table 11 shows the composition and the yields of the propylene oxidation products corresponding to the duration of the reaction of 1 hour.

Table 11

| Reaction products | Mol/ litre | Percent (w/w) | kg/ton of propylene | kg/ton of propylene oxide |
|---|---|---|---|---|
| Propylene oxide | 0.47 | 3.2 | 1370 | — |
| Acetic acid | 0.01 | 0.7 | 30 | 22 |
| Formic acid | 0.01 | 0.5 | 23 | 17 |

The degree of propylene conversion is 11 molar percent.

The yield of propylene oxide with respect to the reacted propylene is 98 molar percent.

EXAMPLE 12

The procedure is the same as described in Example 1. The reaction kettle is made of titanium. Isopropylbenzene is used as a solvent. The reaction temperature is 160°C, the pressure 50 atm. The catalyst is $Cs_3W_2O_4F_7$, taken in amount of 0.1 g.

Table 12 shows the composition and the yields of the propylene oxidation products corresponding to the duration of the reaction of 2 hours.

Table 12

| Reaction products | Mol/ litre | Percent (w/w) | kg/ton of propylene | kg/ton propylene oxide |
|---|---|---|---|---|
| Propylene oxide | 0.54 | 3.64 | 1260 | — |
| Acetic acid | 0.05 | 0.35 | 126 | 100 |
| Formic acid | 0.05 | 0.37 | 96 | 76 |

The degree of propylene conversion is 14 molar percent.

The yield of propylene oxide with respect to the reacted propylene is 91 molar percent.

EXAMPLE 13

The procedure is the same as described in Example 1. The reaction kettle is made of an alloy containing titanium and molybdenum (about 8 percent of molybdenum). Ethylbenzene is used as a solvent. The reaction temperature is 125°C, the pressure, 50 atm. The catalyst is $(NH_4)_2WO_2F_4$, taken in amount of 0.15 g. Table 13 shows the composition and the yields of the propylene oxidation products corresponding to the reaction duration of 3 hours.

Table 13

| Reaction products | Mol/ litre | Percent (w/w) | kg/ton of propylene | kg/ton propylene oxide |
|---|---|---|---|---|
| Propylene oxide | 0.20 | 1.4 | 1260 | — |
| Acetic acid | 0.01 | 0.7 | 65 | 52 |
| Formic acid | 0.01 | 0.5 | 50 | 40 |

The degree of propylene conversion is 15 molar percent.

The yield of propylene oxide with respect to the reacted propylene is 91 molar percent.

EXAMPLE 14

The procedure is the same as described in Example 1. The reaction kettle is made of titanium. The reactor is charged with 100 ml of isobutane, 30 ml of propylene, 100 ml of acetone and 0.15 g of catalyst $(NH_4)_2MoO_2F_4$. The reaction temperature is 150°C, the pressure, 50 atm.

Table 14 shows the composition and the yields of the propylene oxidation products corresponding to the duration of the reaction of 1 hour.

Table 14

| Reaction products | Mol/litre | Percent (w/w) | kg/ton of propylene | kg/ton of propylene oxide |
|---|---|---|---|---|
| Propylene oxide | 0.32 | 2.33 | 890 | — |
| Propylene glycol | 0.05 | 0.48 | 180 | 202 |
| Propylene glycol formiate | 0.02 | 0.26 | 99 | 111 |
| Acetic acid | 0.08 | 0.60 | 230 | 260 |
| Formic acid | 0.06 | 0.36 | 131 | 148 |
| Low boiling products | — | — | 153 | 172 |

The degree of propylene conversion is 12 molar percent.

The yield of propylene oxide with respect to the converted propylene is 64 molar percent.

We claim:

1. A method for preparing propylene oxide comprising oxidizing propylene with atmospheric oxygen in a solvent selected from the group consisting of benzene, acetone, chlorobenzene, fluorobenzene, and an organic solvent which is oxidizable by oxygen to a hydroperoxide at a temperature from 120° to 200°C and pressure from 50 to 100 atm in the presence of a catalyst selected from the group consisting of $(Me)_2MoO_2F_4$, $(Me)_2WO_2F_4$ and $(Me)_3W_2O_4F_7$, or mixtures thereof, where Me is $NH_4$, K, Rb or Cs.

2. A method according to claim 1, wherein the catalyst is $(Me)_2MoO_2F_4$, where Me is selected from the group consisting of $NH_4$, K, Rb, and Cs.

3. A method according to claim 1, wherein the catalyst is $(Me)_2WO_2F_4$, where Me is selected from the group consisting of Rb, Cs and $NH_4$.

4. A method according to claim 1, wherein the catalyst is $(Me)_3W_2O_4F_7$, where Me is selected from the group consisting of Rb and Cs.

5. A method according to claim 1, wherein the said catalyst is taken in an amount of from 0.01 – 0.3 percent by weight.

6. A method according to claim 1, wherein said oxidizable solvent is selected from the group consisting of ethylbenzene, isopropylbenzene, isobutane, isopentane, and cyclohexane.

* * * * *